United States Patent [19]

Brill

[11] 3,887,907
[45] June 3, 1975

[54] OIL DETECTOR

[76] Inventor: Eugene L. Brill, 1803 W. Royalton Rd., Cleveland, Ohio 44147

[22] Filed: Nov. 12, 1973

[21] Appl. No.: 414,996

[52] U.S. Cl. ............... 340/236; 73/61.1 R; 210/85; 210/DIG. 21
[51] Int. Cl. ......................................... G08b 21/00
[58] Field of Search ................. 73/61.1 R; 340/236; 210/400, 85, 86, DIG. 21

[56] References Cited
UNITED STATES PATENTS

| | | | |
|---|---|---|---|
| 3,603,952 | 9/1971 | Smith | 340/236 X |
| 3,709,369 | 1/1973 | Brill et al. | 210/400 |
| 3,719,936 | 3/1973 | Daniels et al. | 340/236 |
| 3,733,594 | 5/1973 | Orth, Jr. | 340/236 |
| 3,763,706 | 10/1973 | Hubby | 73/61.1 R X |
| 3,774,185 | 11/1973 | Parth | 73/61.1 R X |
| 3,800,219 | 3/1974 | Fosberg | 340/236 X |

*Primary Examiner*—Richard C. Queisser
*Assistant Examiner*—Joseph W. Roskos
*Attorney, Agent, or Firm*—Baldwin, Egan, Walling & Fetzer

[57] ABSTRACT

A method and apparatus is disclosed for detecting the presence of oil floating on water and includes taking a continuous liquid sample from the surface of the water at a substantially steady rate, by a hydrophobic collector which discriminates between oil and water, collecting more oil and less water, collecting a sample of predetermined parameter, such as weight or volume, in a predetermined time, dumping each sample at the end of the said predetermined time, and providing a signal when a sample reaches the predetermined parameter in less than the predetermined time due to the presence of oil in the sample.

9 Claims, 10 Drawing Figures

OIL DETECTOR

BACKGROUND OF THE INVENTION

An oil spill is like a fire. If it is detected very early before it gets out of control, it can usually be stopped quite easily and damage and expense can be kept to a minimum. Oil spill warning devices presently known are usualy undependable because they have been adapted from process control equipment which was designed to operate under controlled conditions of chemistry, temperature and cleanliness. Because these warning devices must usually operate under conditions including dirt and debris where the spill occurs, they have proven to be unreliable so that usually the first indication that a company has regarding an oil spill which has occurred is a call from an enforcement agency stating that some waterway is completely oil covered. In this case, the loss of product, damage to property and expense of clean-up ranks oil spills along with fires with regard to expense. The present invention, therefore, should rank along with automatic sprinkler systems which afford a means of not only warning that a fire is in progress but also a means of taking steps to extinguish the fire. The invention presented herewith does exactly the same thing for oil spills. The detector warns that oil is escaping so that it may be stopped immediately at its source. The oil skimmer forming a portion of the present device cleans up the lost oil before it gets off the property.

Under the conditions usually encountered in waste water streams, conditions are uncontrollable, and usually involve a lot of dirt and debris so that in a short time most of the prior known devices for this purpose become clogged up by scum deposits or debris and give false signals or none at all.

The present invention is fundamentally based on a hydrophobic type of oil skimmer which depends upon the fact that oil clings to certain plastic or metal surfaces while water is repelled by it. This invention utilizes this difference to furnish a very reliable signal that there is oil floating on a water surface. This invention relates to the detection of a hydrophobic immiscible liquid floating on the surface of an aqueous liquid. To avoid repetition of this wordy statement, the specification and claims hereinafter will relate to oil floating on water which is the commonly encountered condition.

An object of the present invention, therefore, is to provide a method and apparatus for detecting the presence of oil floating on water which includes the taking of a continuous liquid sample from the surface of the water at a substantially steady rate, collecting a sample of predetermined parameter, such as weight or volume, in a predetermined time as constituting one cycle of the operation, and then dumping each sample at the end of each cycle. Using a skimmer which lifts a minimum of liquid from the surface of the water when no oil is present, but which lifts a much larger amount of liquid when oil is present, the invention provides a system wherein if the collected sample is substantially all water, the same is dumped at the end of each cycle without providing a signal. However, if the collected sample involves some volume of oil, then the sample reaches a predetermined parameter in less than the usually predetermined time of dumping and therefore the collected sample is utilized to give a signal indicating the presence of oil.

Another object of the present invention is to utilize a flexible, hose-like elongated collector having an attraction for the hydrophobic liquid resting upon the water to pick up the oil collected by an endless loop floating on the water, which is then carried out of the water where a doctor blade scrapes the coated material from the collector hose. A known device is described for this function.

Another object of the invention is to provide apparatus which will function efficiently over long periods of time without being clogged by scum or debris which is often found in the waste water being sampled. This includes the use of a pressure switch utilized to produce a signal, and valves for controlling the same, which encounter only air. The device utilizes an overflow pipe and a measuring chamber to provide the sample relied on to produce the signal which contact water only so as to provide the desired accuracy of the measurements upon which the detector relies. The oil which is collected by the skimmer and which triggers the operation of the detector system has a very limited penetration into the apparatus because it is separated from the water at its first entrance into the system in a separation chamber which provides plenty of volume to separate out sludge and heavy debris.

Another object of the invention is to provide a periodic blowdown operating backward through the apparatus of the invention which blows any condensate out of the sensing lines, clears the water passages and backwashes any debris out of the collector system so that each of the continuous series of samples, each collected in the same predetermined time, finds a substantially clean apparatus for taking and measuring the sample.

Other objects and advantages of the invention will be apparent from the accompanying drawings and the specification relating to the same, and the essential features thereof will be set forth in the appended claims.

In the drawings,

FIG. 9 shows the condition of the control circuit under the situation presented in FIG. 8; while

Figure 1:
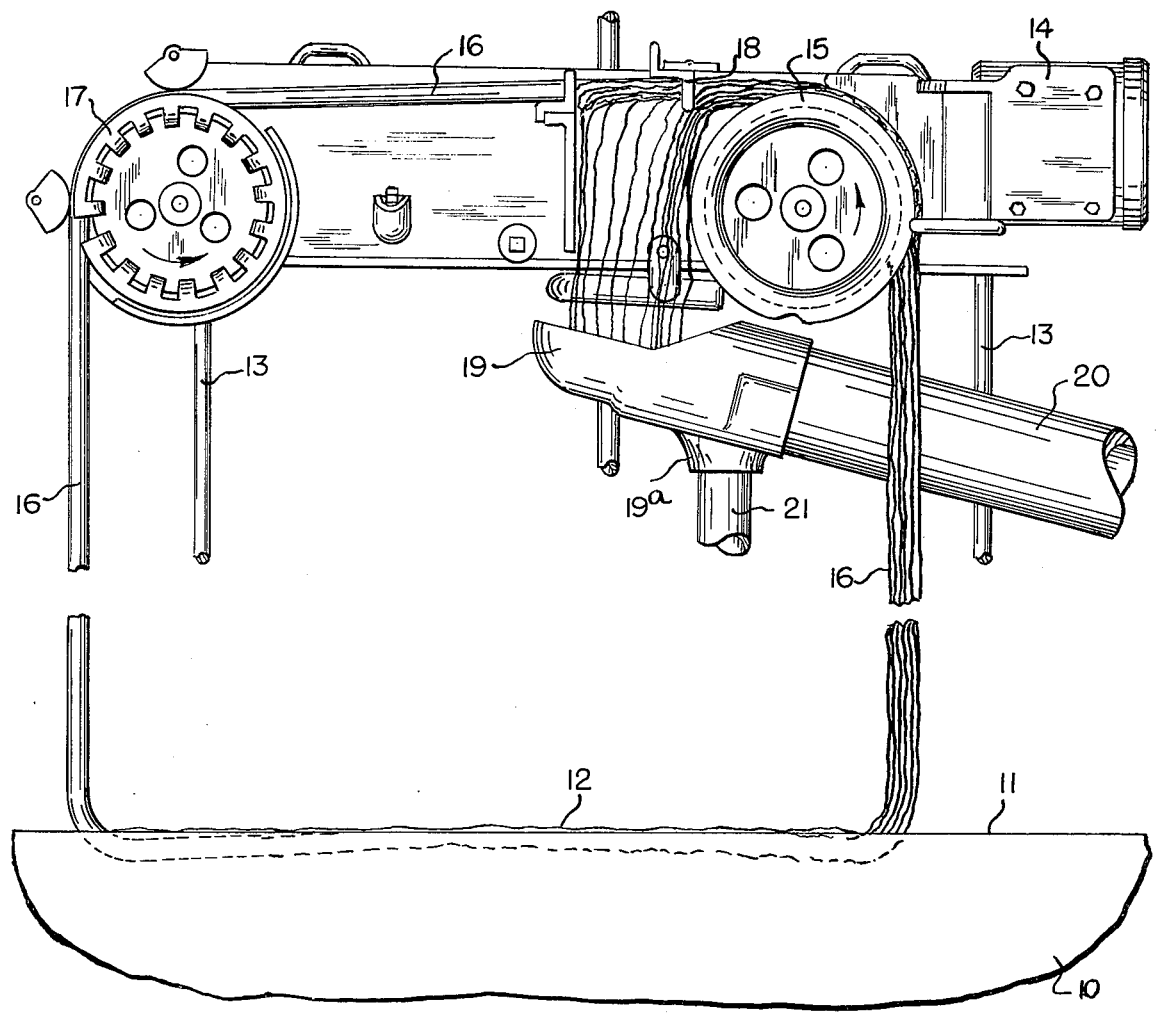
FIG. 1 shows a known oil skimmer modified to cooperate with the present invention.

While this invention might be applied to almost any device involving a hydrophobic type oil skimmer which depends upon the fact that oil clings to certain plastic or metal surfaces while water is repelled thereby, I have chosen to show the same using an oil collector which is described and claimed in U.S. Pat. No. 3,709,369, granted Jan. 9, 1973 to Eugene L. Brill et al. This patent shows a reservoir 10 containing water 11 on which floats a layer 12 of oil or the like. Mounted above the reservoir on a suitable structure 13 is a frame 14 which mounts mechanism which passes the cylindrical flexible collector loop 16 downwardly as seen at the left-hand side of FIG. 1 into the reservoir 10 by means of a drive wheel 17 and then upwardly out of the reservoir at the right-hand side of FIG. 1 and over a transfer wheel 15, after which it engages a doctor blade 18 which scrapingly engages the collector 16 so as to remove the material coating the collector tube which drops away as indicated at 19. The material removed by the scraper 18 drops into an upwardly opening cup or pan 19 which is connected with a discharge tube 20 which leads the skimmed material away to a suitable storage tank.

To adapt this device to the present invention, an outlet 19a is provided at the bottom of the pan or cup 19 into which is threaded a standpipe 21 which is the first element of the new oil detecting apparatus. In one embodiment, this standpipe is four inches in diameter but this dimension depends upon the volume of oil expected to be treated or encountered.

Figure 2:
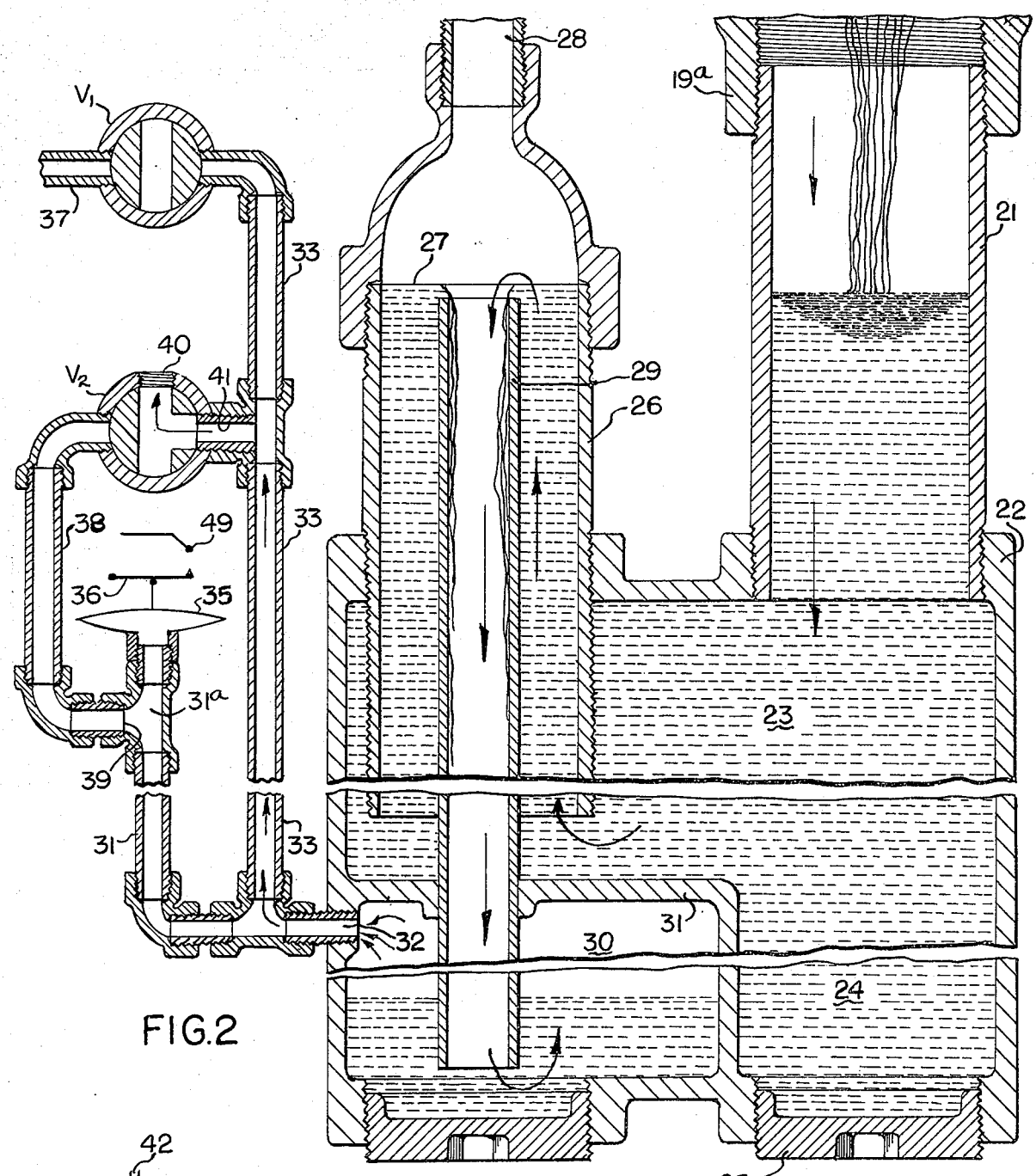
FIG. 2 is a sectional view through the oil detector of the present invention showing the condition of the same at the beginning of the collecting cycle.

Referring to FIG. 2, the standpipe 21 communicates at its lower end with a casting 22 which provides a separation chamber 23 where oil separates from water when oil is encountered. In the lower portion of the separation chamber, there is provided a separation pit or sump 24 which is of sufficient size to handle sludge or fine debris for a considerable period of time. When necessary the sump 24 may be cleaned by opening the drain plug 25 for that purpose.

To insure water as clean as possible for the measurements required in operation of this invention, means is provided to insure passage of the water on a path which travels upwardly for a predetermined distance and then falls downwardly for further use in this invention. This means is shown in FIG. 2 as comprising as impervious tubular vertical baffle chamber 26 rising to a level 27 opposite to an intermediate portion of the standpipe 21. Communicating upwardly out of the baffle chamber is a vent pipe 28 which usually extends several feet upwardly into the air so as to prevent undesired ejection of water at this point during the blowdown period presently to be described. A vertical overflow pipe 29 is provided within the baffle chamber and extends from a point near the upper end thereof downwardly where it communicates at its lower end with a measuring chamber 30 which is divided by an imperforate partition 31 from the separation chamber so as to provide an independent chamber for the measuring which is necessary in the operation of this invention.

Figure 6:
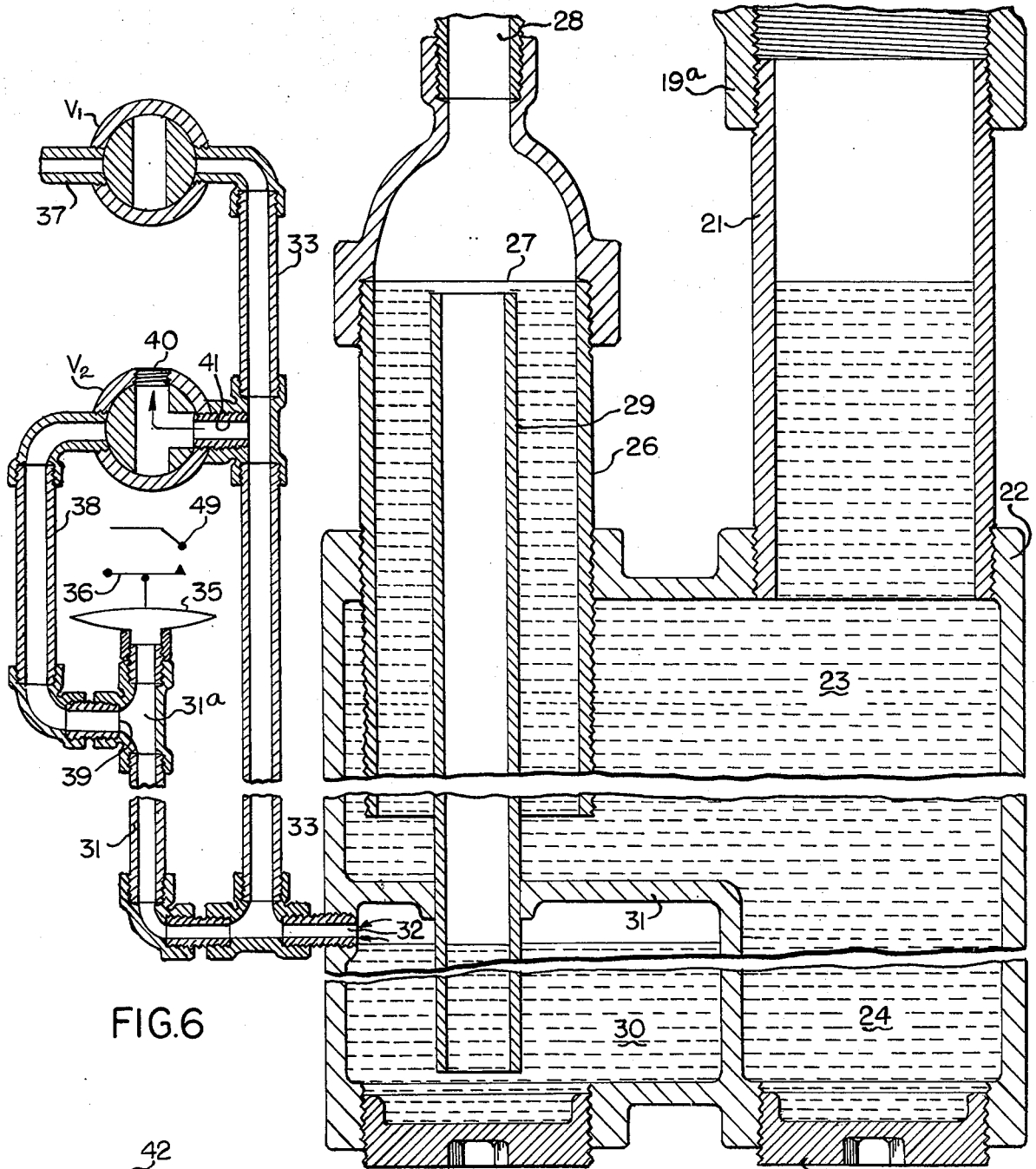
FIG. 6 shows the condition of the apparatus when water only is present and has failed to fill the measuring chamber just preparatory to dumping the same without causing a signal.

The parts of the detector system are so designed and of such a volume that when water only is collected during a predetermined time period, the measuring chamber 30 will not be filled above the level shown in FIG. 6 and no signal will be generated. This device has been operated in one embodiment utilizing approximately a ten minute collection cycle and if at the end of that time the measuring chamber has not filled a volume greater than the volume of the measuring chamber, then a blowdown period occurs as will be presently described and that sample is blown out and the entire system purged ready to collect another sample.

Figure 4:
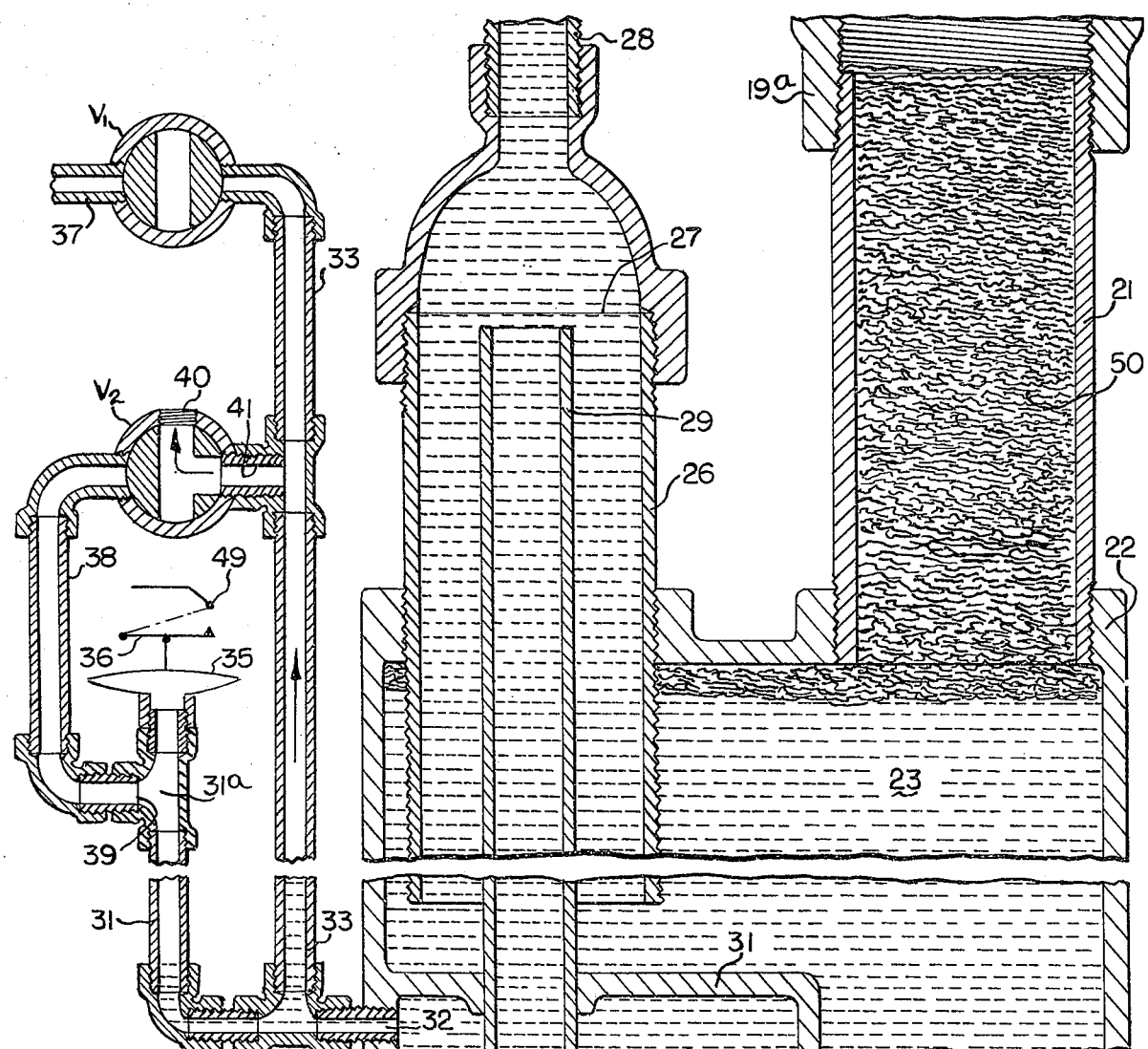
FIG. 4 shows a condition of the apparatus when oil is entering the detector and causing the apparatus to produce a warning signal.

However, if oil is carried up from the reservoir 10 to the scraper 18 in sufficient quantity, as illustrated in FIG. 4, then water is caused to travel out of the measuring chamber into a signal producing system which will now be described. A pressure sensor pipe 31 communicates with the measuring chamber 30 at a point 32 near the top of the measuring chamber. This pipe 31 is filled with air. A blowdown pipe 33 is parallel to the pipe 31 and communicates with the measuring chamber at 32 at a point nearer the measuring chamber than pipe 31. If the inflow of oil as illustrated in FIG. 4 causes a greater increase in volume in the measuring chamber during the ten minute collecting period than is normal when water only is being handled, then water is forced out of the measuring chamber at 32 and passes into the blowdown pipe 33 which is then vented at 40 which permits the water to rise in the blowdown pipe. This water exerts a hydrostatic pressure at the lower end of the pressure sensor pipe 31 causing air pressure to build up in the upper part of pipe 31 as indicated at 31a and this pressure passes into a pressure switch 35 which is of a shape and construction which permits the switch to expand upwardly to actuate switch 36 causing a signal. The term "signal" as used herein in the specification and claims is intended to cover a horn and/or a light and may also include a valve closing device, not shown, where the valve is so located as to stop the flow of oil being detected by this device.

It has been stated previously that this invention contemplates taking a continuous series of samples, each of which runs for the same predetermined period of time. At the end of such a time period, a blowdown operation occurs. At such time a pipe 37 is placed in communication with the top of the blowdown pipe 33 so that compressed air or gas enters at that time. The pipe 37 might be connected with a continuously available gas pressure or it might be connected to a small compressor which is started and stopped as required in the blowdown cycles of the present invention. The control of the connection between pipes 37 and 33 is carried out by this invention in this embodiment by a valve V1 which is a solenoid operated valve energized through lines 34a and 34b. The valve V1 is a two-way valve which in the position shown in FIGS. 2, 4 and 6 prevents any flow from the pipe 37, but in the position of FIG. 8 connects pipes 37 and 33.

The valve shown at V2 is a solenoid operated valve of the three-way type and is also energized through the lines 34a and 34b. In the position of the parts shown in FIGS. 2, 4 and 6, the valve V2 shuts off a by-pass line 38 which communicates between an intermediate portion of the blowdown pipe 33 to a point 39 in the pressure sensor line 31 below the pressure switch 35. This pipe 38 must be closed at its upper end at such times so as to aid in the building up of air pressure in line 31 to operate the pressure switch 35 as previously described. As illustrated also in FIGS. 2, 4 and 6, the valve V2 in such position (closing pipe 38) also opens up a vent at 40 which communicates at 41 with the blowdown pipe 33.

Figure 3:
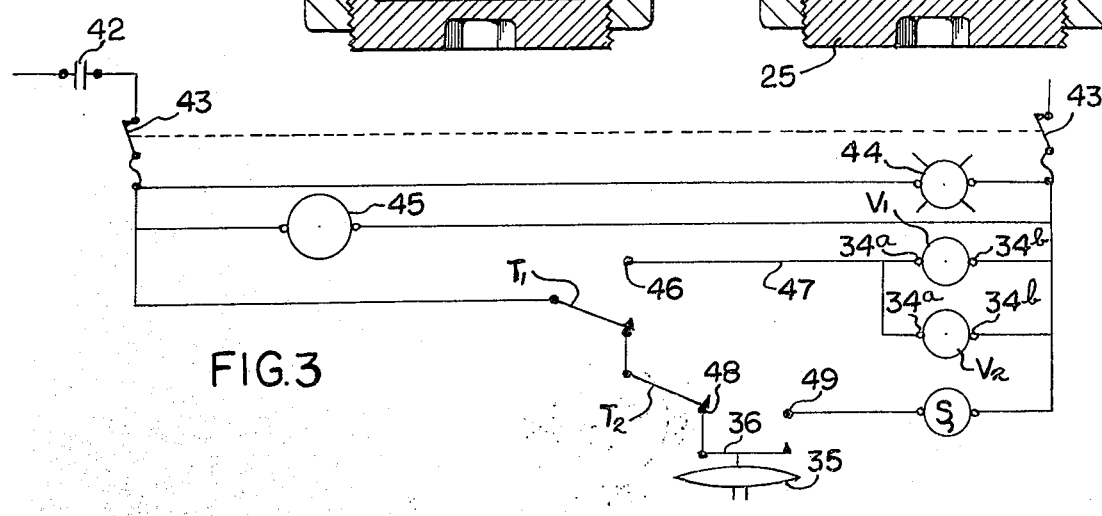
FIG. 3 shows the position of a control circuit under the conditions of FIG. 2.

The control system and its operation will be clearly understood from FIGS. 3, 5, 7 and 9. Power is supplied from line L1 and L2 energized only through an auxiliary contact 42 which is energized only when the oil skimmer is operated to drive pulley 17. Power to the oil detector is provided through a double pole single throw switch indicated at 43. A green light 44 is energized to show the oil detector is operating. A timer motor 45 is connected across the lines L1 and L2 and operates at all times when power is on the oil detector device. The timer motor operates the timer arms T1 and T2 at predetermined points in the cycle as will be described. T1 normally engages contact 51 which is connected by line 52 to the fixed end of arm T2. A normally open contact 46 is connected by line 47 to supply power to valves V1 and V2 as shown by connecting conduits. T2 normally engages contact 48 which is connected to one end of pressure switch arm 36. The time control member T2 is normally closed in contact with the contact member 48 as seen in FIG. 3 which is in circuit with the fixed end of the pressure actuated switch 36. When the pressure switch is actuated as previously described, it makes contact at the normally open contact member 49 which as seen in the diagram is in series circuit with the signal indicated at S which represents a horn and/or a light, or a device to shut off a valve or other instrument which may be controlling the flow of oil which is picked up by this detector.

In the position of the parts in FIG. 3, the timer actuated members T1 and T2 are in normally closed position but the pressure switch is open so no signal or activity takes place.

Figure 5:
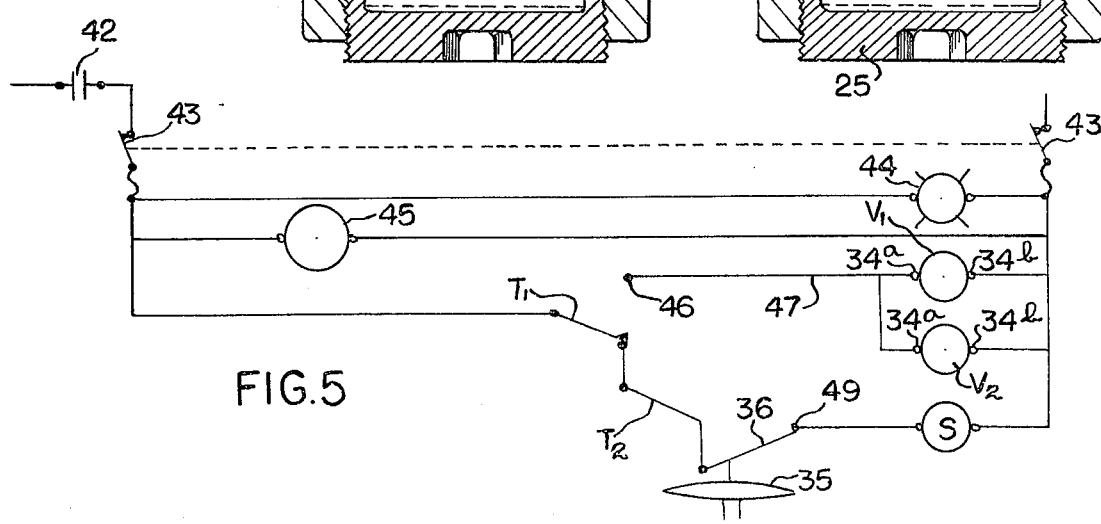
FIG. 5 shows the condition of the control circuit under the situation presented in FIG. 4.

Referring to FIGS. 4 and 5, the oil entering at 50 due to the skimmer having collected oil and scraped it off at 18 as previously described, enters the separation chamber 23 where the oil floats on the water, but the water is pushed more rapidly into the baffle chamber, the overflow tube 29 and the measuring chamber 30. Thus, the measuring chamber fills before the predetermined time period set on the timer as previously described causing water from the measuring chamber to pass out at 32 and to rise in the blowdown pipe 33 which causes pressure to be exerted in the pressure sensor pipe 31. Finally, the hydrostatic head in the blowdown pipe 33 increases the air pressure in the pressure sensor pipe 31 to the point where it actuates the pressure switch 35 moving the pressure switch armament 36 into engagement with the contact 49 as shown in FIG. 5, thus energizing the signal S.

Figure 7:
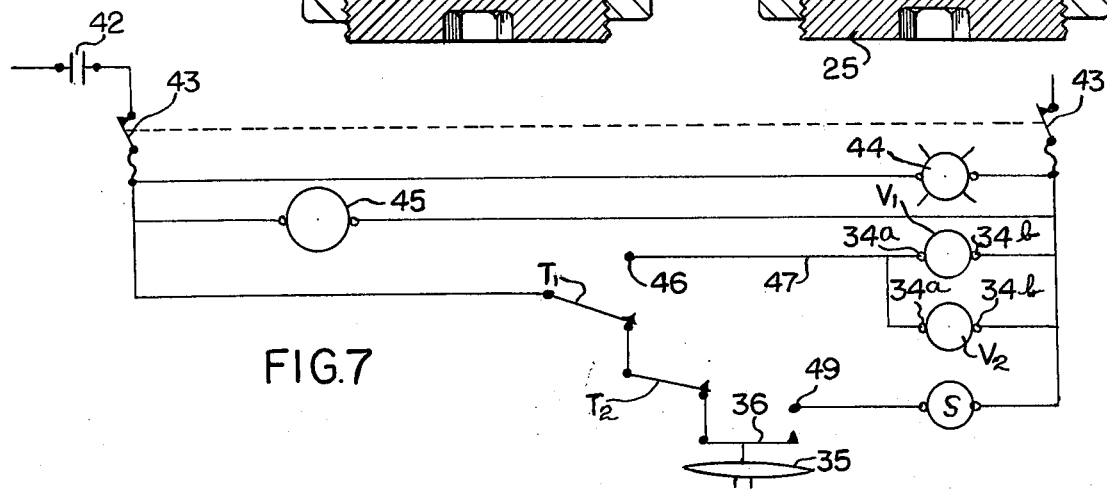
FIG. 7 shows the control circuit under the conditions presented in FIG. 6.
Figure 8:
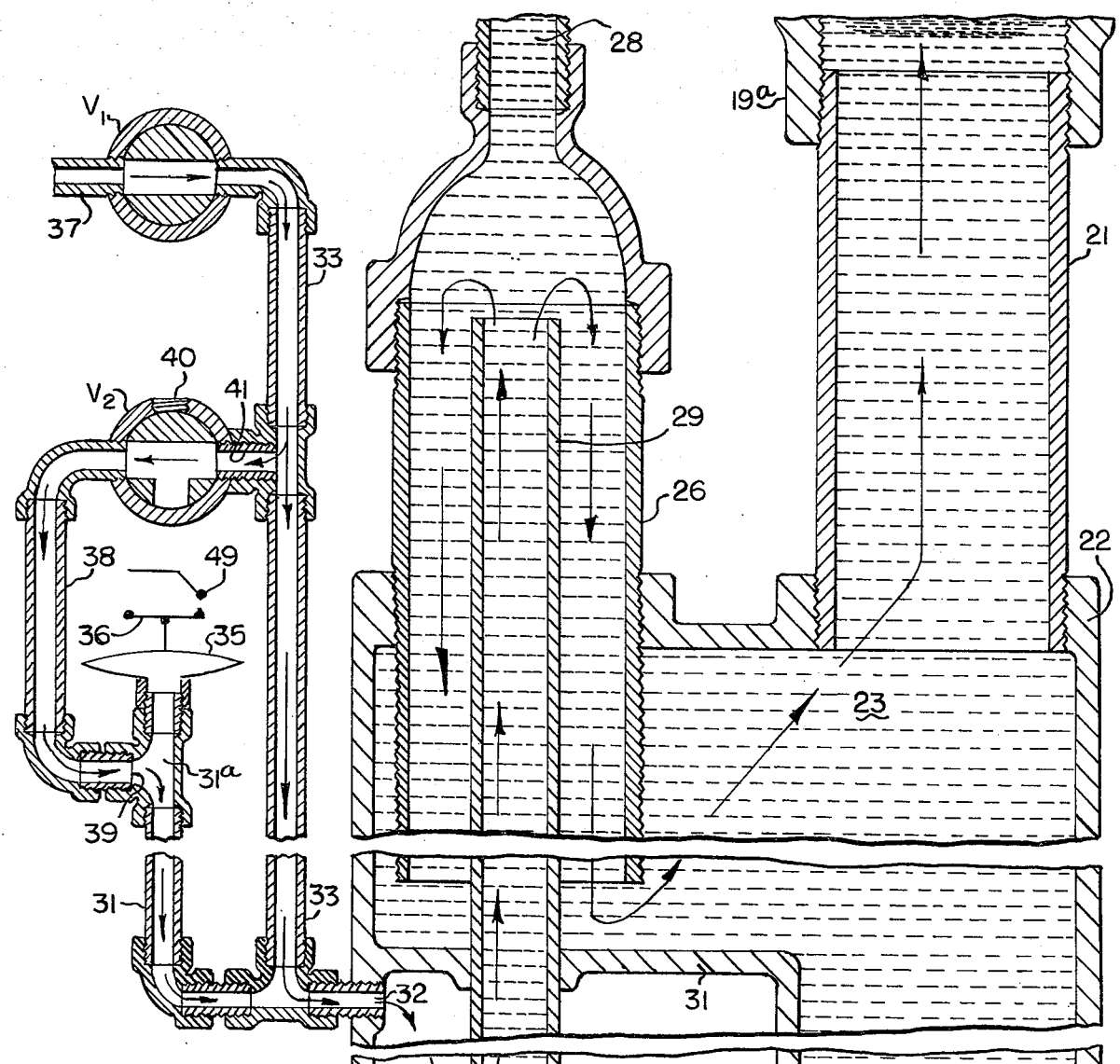
FIG. 8 shows the conditions in the collector during the blowdown which occurs at the end of each cycle of predetermined time.
Figure 9:
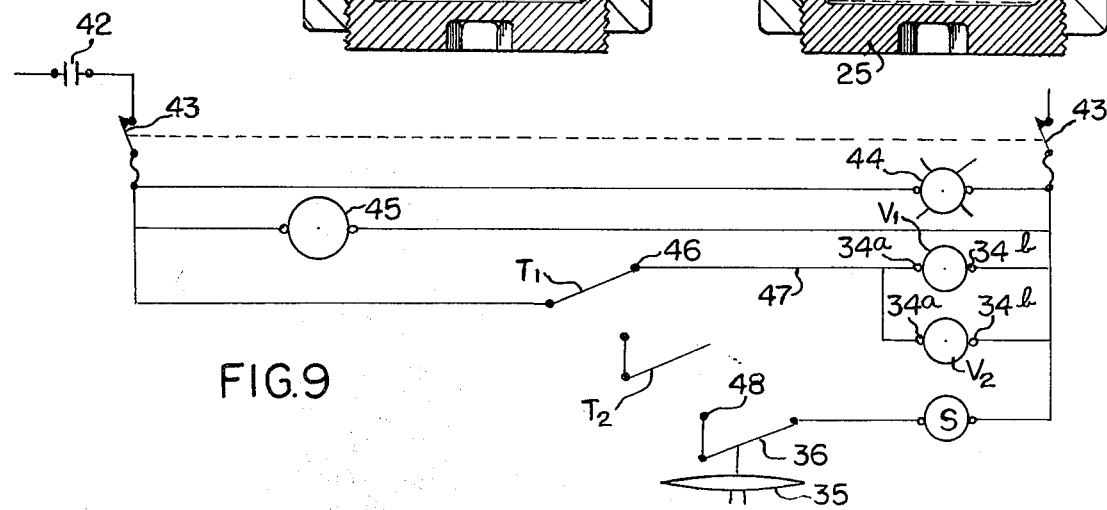

Under the conditions shown in FIGS. 6 and 7 the measuring chamber is filling with water but this represents a condition where the chamber will not be overfilled in the predetermined time period controlled by the timer motor and when the time runs out for the predetermined period, the timer member T1 will engage the contact 46 which will energize the valves V1 and V2 causing a dumping or purging action as set forth with respect to FIGS. 8 and 9.

With the conditions shown either in FIG. 4 or FIG. 6, when the predetermined time cycle has run out on the timer motor, the controls move to the position shown in FIG. 9 where the timer member T1 makes contact at 46 energizing the valve V1 and V2 so as to connect the compressed gas from 37 into the blowdown pipe 33 and at the same time cutting off the vent at 40 and connecting line 41 to 38. At the same time, the timer member T2 is lifted out of contact with contact 48 so that the oil signal S is impossible to be energized. The compressed air or gas then flows as indicated by the arrows in FIG. 8 cleaning out the blowdown pipe 33, the by-pass line 38, the pressure sensor line 31, the measuring chamber 30, the overflow pipe 29, the baffle chamber 26, and then flows out through the separation chamber 23 and the standpipe 21. This material goes through the pan or cup 19 and out the discharge line 20. Meanwhile, the oil skimmer continues to run the collector line 16 through the oil covered water and will continue in the usual manner to pick up oil. Thus, the use of this oil detector does not interfere with the normal action of the oil collector mechanism.

Figure 10:
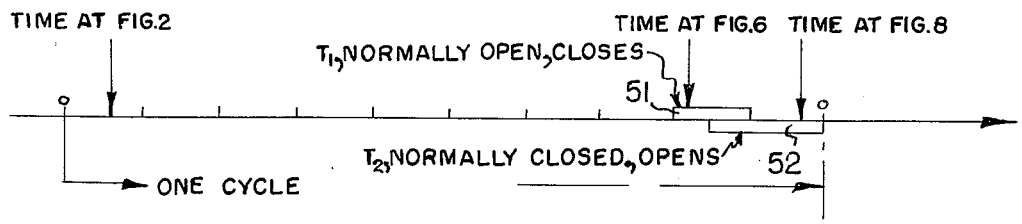
FIG. 10 is a diagram of a timer cycle.

One of the predetermined time cycles is shown diagrammatically in FIG. 10. At the left end of the time line, the condition of FIG. 2 is indicated by an arrow. Here a cycle has just started and the measuring chamber has a small amount of water in it. The cycle continues for eight to ten minutes gradually collecting more and more water in the measuring chamber 30. The time at FIG. 6 is also indicated by an arrow. The timer operated member T1 moves from the position shown in FIG. 7 to the position shown in FIG. 9 during the time period indicated by the block 51. This changes the position of valves V1 and V2 as previously indicated so as to provide compressed gas or air through V1 and through V2 to completely purge the system as previously described. The timer operated member T2 opens to the position of FIG. 9 during the time block indicated at 52. This de-energizes the pressure switch 35, 36. The time indicated for the condition at FIG. 8 is indicated by an arrow on FIG. 10. The blowdown condition as shown in FIG. 8 lasts for about one minute and then approximately one minute rest period occurs to allow the liquid level to settle back to approximately the condition of FIG. 2 before the pressure switch 35, 36 is again energized. This avoids any unsettled action of the pressure switch. The blowdown operation utilizes approximately 0.35 cubic feet of air during the approximately one minute of blowdown when the measuring chamber has a net value of approximately one-half gallon of water in one embodiment of this invention.

Valves V1 and V2 are normally held in the position shown in FIG. 2 by springs, not shown, and are moved to the position shown in FIG. 8 only when their actuating solenoids, diagrammatically indicated in FIG. 9, are energized through 34a and 34b.

In an actual installation, the pressure switch 35, 36 and the valves V1 and V2 are located above the water level at the top of the standpipe 21 so that these parts will not be fouled up.

The blowdown period cleans any condensate out of the pressure sensing lines, clears all of the water passages from the measuring chamber and the blowdown pipe back to the standpipe 21 and backwashes any debris out of the standpipe 21 and back into the discharge conduit 20.

The oil detector device of this invention has been calibrated using the flexible floating tube type of skimmer shown in U.S. Pat. No. 3,709,369 using as a collector tube, one made of urethane of three-quarter inch diameter and traveling about 100 feet per minute while collecting a sample from the surface of the water reservoir. This device will pick up not more than three gallons per hour of water nor less than five gallons per hour of oil at the highest speed which may go as high as 170 feet per minute. These figures are based on No. 2 fuel oil or equal. A majority of the situations encountered in removing oil from the surface of waste water reservoirs use a slower speed between about 70 to 100 feet per minute in the collector tube and pick up 0.50 to 0.75 gallons per hour of water as against 20 to 30 gallons per hour of lubricating, hydraulic or insulating oils. These figures calculate to a ratio of 1.67 parts oil to one part water under the worst conditions and 40 parts of oil to one part of water under normal conditions. Higher oil viscosities give even more favorable ratios to enable this detector to distinguish between oil and water. These ratios in a series of tests held true over all practical ranges of temperature, acidity and salinity. This was true even when large amounts of dirt and debris were present. Therefore, the oil detector hereinabove shown and described is dependable for detecting the difference between oil and water when the same are lifted out of a reservoir by a hydrophobic oil skimmer.

What is claimed is:

1. The method of detecting the presence of oil floating on water, comprising taking and collecting all of a continuous liquid sample from the surface of said water at a substantially steady rate using a hydrophobic collector having a greater affinity for oil than for water, collecting a continuous series of samples, each sample of predetermined parameter in a predetermined time constituting a cycle, dumping each sample at the end of each cycle, and providing a signal when a sample reaches said predetermined parameter in less than said predetermined time due to the presence of oil in said sample.

2. Apparatus for detecting the presence of oil floating on water, including collector means for taking a continuous liquid sample from the surface of said water at a substantially steady rate using a hydrophobic collector having a greater affinity for oil than for water, means for continuously removing said sample from said collector means, a standpipe and separation chamber below and in communication with said sample removing means, an impervious tubular vertical baffle chamber communicating at the lower end with said separation chamber at a zone spaced from the top thereof, a vent pipe having a lower end communicating with the top of said baffle chamber and extending upwardly therefrom, a vertical overflow pipe within said baffle chamber and extending from a point near the upper end thereof downwardly, the top of said overflow pipe being at a level with an intermediate portion of said standpipe, the lower end of said overflow pipe communicating with an independent measuring chamber, said measuring chamber being of a size not overfilled when said collector means sample is substantially all water, signal means responsive to overfill of said measuring chamber when said collector means sample includes more than a trace of oil for causing a signal, and means for automatically emptying said measuring chamber regularly at predetermined uniform time periods.

3. Apparatus for detecting the presence of oil floating on water as defined in claim 2, wherein said signal means includes a pressure switch, a pressure sensor conduit communicating in an air-tight manner between said measuring chamber and said pressure switch, and said conduit communicating with said measuring chamber near the top thereof.

4. Apparatus for detecting the presence of oil floating on water as defined in claim 3, wherein said means for automatically emptying said measuring chamber comprises a blowdown pipe in parallel with said pressure sensor conduit and communicating with said measuring chamber upstream from said pressure sensor conduit, said blowdown pipe extending to a higher level than said pressure switch, a by-pass line communicating between an intermediate portion of said blowdown pipe to a point in said pressure sensor below said pressure switch, a normally closed valve in said by-pass line, and said means for automatically emptying said measuring chamber includes means for automatically supplying gas under pressure at said predetermined uniform time periods at the upper end of said blowdown pipe while simultaneously opening said valve in said by-pass line, whereby to purge said blowdown pipe, said by-pass line, said pressure sensor conduit, said measuring chamber, said overflow pipe, said baffle chamber, and said separation chamber and said standpipe.

5. Apparatus as defined in claim 4, wherein said pressure switch is above the level of the top of said overflow pipe.

6. Apparatus as defined in claim 4, including timer means for automatically supplying said pressure gas regularly at predetermined uniform time periods for short intervals, then deactivating said pressure switch for a short rest period, and then reestablishing normal sample collecting conditions.

7. Apparatus as defined in claim 2, including a sludge pit in the bottom of said separation chamber, and a clean-out plug giving access to said pit.

8. The method of detecting the presence of oil floating on water, comprising taking a continuous liquid sample from the surface of said water at a substantially steady rate using a hydrophobic collector having a greater affinity for oil than for water, collecting a continuous series of samples, the taking of each of said samples comprising passing a flexible endless loop collector having an attraction for oil into the water and through said oil and upwardly and away from said water coated with a small volume of water or a larger volume of oil, and removing said coating to provide said sample, each sample of predetermined parameter in a predetermined time constituting a cycle, dumping each sample at the end of each cycle, and providing a signal when a sample reaches said predetermined parameter in less than said predetermined time due to the presence of oil in said sample, the collection of each sample including displacing water with the collected sample and measuring the volume of displaced water in a chamber of fixed size, and utilizing excess water beyond said chamber size accumulated in said predetermined time to provide said signal.

9. The method of detecting the presence of oil floating on water, comprising taking and collecting all of a continuous liquid sample from the surface of said water at a substantially steady rate using a hydrophobic collector having a greater affinity for oil than for water, collecting a continuous series of samples, each sample of predetermined volume in a predetermined time constituting a cycle, dumping each sample at the end of each cycle, and providing a signal when a sample reaches said predetermined volume in less than said predetermined time due to the presence of oil in said sample.

* * * * *